Figure 1:
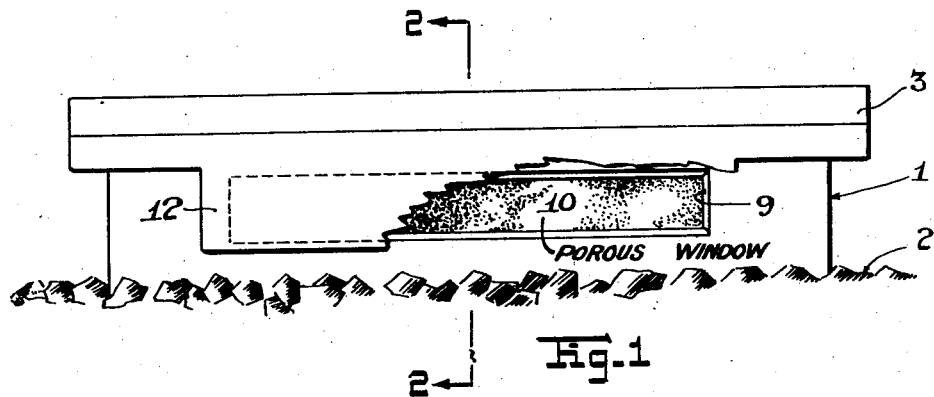

March 9, 1948. LE ROY S. DUNHAM 2,437,422
PROTECTIVE GAS-PERMEABLE CONTAINER FOR AIR-DEPOLARIZED CELLS
Filed Aug. 24, 1944

Inventor
LeRoy S. Dunham
By Henry Lanahan
Attorney

Patented Mar. 9, 1948

2,437,422

UNITED STATES PATENT OFFICE 2,437,422

PROTECTIVE GAS-PERMEABLE CONTAINER FOR AIR-DEPOLARIZED CELLS

Le Roy S. Dunham, East Orange, N. J., assignor to Thomas A. Edison, Incorporated, West Orange, N. J., a corporation of New Jersey Application August 24, 1944, Serial No. 551,023

7 Claims. (Cl. 136—172)

This invention relates to novel protective containers for gas consuming and/or producing objects or systems, and more particularly to protective containers which have the ability to ventilate such objects or systems with gas constituents of the outside ambient.

This invention is based on the discovery that upon steadily consuming a constituent of the atmosphere in a container having a few small openings to the outside—say several openings localized in one region of $\frac{1}{8}''$ diameter each—that constituent becomes substantially depleted within the container; on the other hand, if these openings in the container are closed and a window of fine porous material is installed in a wall of the container in lieu of the holes, the percentage content of that constituent in the container is substantially maintained. This phenomenon has been demonstrated, and is herein particularly illustrated and described, in connection with a container for an air-depolarized primary battery cell.

Air-depolarized primary cells comprise a cathode of porous carbon, an electrolyte of caustic alkali solution and an anode of zinc. As such a cell is discharged, hydrogen collects on the cathode and has there a polarizing action, but it is a characteristic of a porous carbon cathode that it absorbs oxygen from the air and conducts it to the immersed surfaces of the cathode, where it combines with the hydrogen to depolarize the cell and maintain it in working condition. The amount of oxygen consumed by the cell is, according to Faraday's law, dependent upon the amount of electricity which is discharged from the cell, the amount being .298 g. per ampere hour. In other words, the rate of oxygen consumption is directly proportional to the value of the discharge current, this rate being approximately 20.8 cc. of oxygen per hour, under standard conditions, for 100 ma. of current discharge.

In out-of-door services, such as railway signaling, the batteries have to be well housed to protect them from elements of the weather, dirt, extremes of temperature and tampering. Strong boxes of wood, metal or concrete are used for this purpose. Notwithstanding that such boxes have small cracks, as for example where the lid closes against the box, air-depolarizing batteries are capable of giving only a fraction of their normal output when housed in such boxes because of inadequate oxygen supply. In accordance with my invention, I find that when such a box is provided with a wall section of a suitable porous material, the air-depolarized cells will function substantially at their normal capacity, and will do so irrespective of whether the box has some small openings, holes or cracks or is otherwise hermetically sealed. In other words, it is found that a few small openings in the container for an air-depolarized cell will not supply ample oxygen to the cell but that a porous window will supply continuously such oxygen to maintain the cell at normal operating efficiency.

This phenomenon is believed to have many practical applications other than in connection with containers for air-depolarized cells. For example, it may have application to containers for any gas consuming and/or producing object or system which requires protection from elements of the outside ambient and from ambient temperature variations while yet having to be ventilated by constituents of that ambient—the term "ventilating" being here used to include both admitting and removing these constituents into and out of the container. For example, such other objects may comprise chemicals or cultures such as tissues, fungi, microörganisms, etc.

My invention has for its objects to provide a novel and improved container for gas utilizing and/or producing objects or systems which will supply or ventilate such objects or systems with gas constituents of the outside ambient, protect the objects or systems from exposure or contact with undesired and foreign elements of the ambient and also protect them from drafts and outside temperature influences.

It is a further object of my invention to provide novel and useful applications of molecular diffusion of gases through porous walls or membranes.

It is a further object to provide a novel protecting and ventilating container for an air-depolarized cell.

Other and allied objects and features of my invention will more fully appear from the following description and the appended claims.

Figure 2:
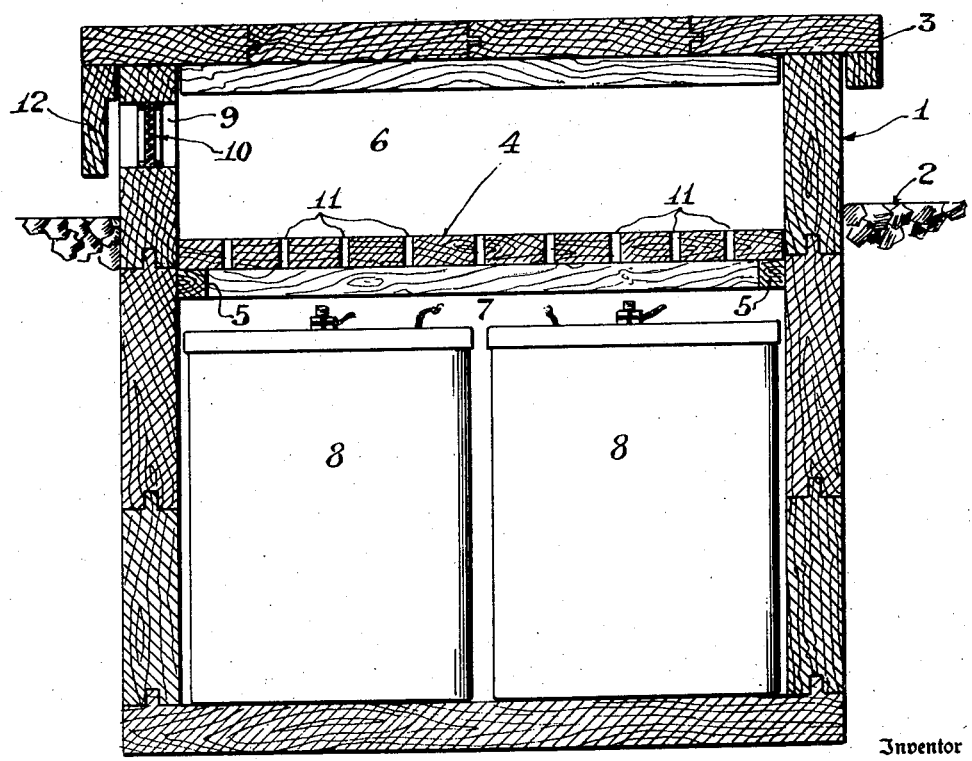

In the description of my invention reference is had to the accompanying drawings, of which:

Figure 1 is a side elevational view, partly broken away, of a box for primary cells in which my invention is incorporated; and Figure 2 is a vertical sectional view taken on the line 2—2 of Figure 1.

In the accompanying figures there is shown a standard form of box 1 for housing primary cells. This is a heavy, strong box made of wood and intended for out-of-door services as, for example, housing primary cells for railway signaling purposes. Commonly, such boxes are partially buried in the ground, referred to as 2, leaving the upper portion of the box and its top lid 3 exposed to the open air. Below the ground level there is within the box a second cover or lid 4, known as a frostboard, which is supported on ledges 5 secured to the sides of the box. Thus, there are formed in the box upper and lower compartments 6 and 7. The lower compartment is for containing a number of primary cells 8, and the upper compartment serves to thermally insulate the batteries from the temperature of the outside.

These boxes are fairly tight in construction, being ordinarily made of heavy boards joined in tongue and groove relationship as shown, but they are not airtight since they will normally have some small cracks particularly between the top lid and the side walls of the box. Nevertheless, it is found in actual practice that these boxes are too tightly constructed to provide the necessary ventilation for primary cells of the air-depolarized type.

By my invention I find that these boxes can be readily altered so that they will amply ventilate the air-depolarized cells 8 while yet affording all needed protection to the cells. This is done by providing an aperture 9 in the lid or side wall of the box preferably in the upper portion of the side wall between the top lid 3 and the frostboard 4 as shown, and installing in this aperture a porous window 10. Then in the frostboard I provide a series of open holes 11, say ½" in diameter, so as to give ample ventilation between the top compartment 6 and the lower battery compartment 7. For protecting the window 10 from direct contact with elements of the weather and from dirt, it is covered by a guard plate 12 which may be attached to a side of the top lid 3. This guard depends down across the window but is spaced therefrom as shown.

In accordance with my invention any of various suitable porous materials may be used for the window 10. Empirical tests have shown the following to work satisfactorily; wood cut crossgrain, the kind being not critical, pine for example being very suitable; fibrous aggregated building board such as commercial Celotex; coherent aggregated porous lime formed by moistening powdered lime with calcium chloride solution, pressing the same to shape in a die and drying; coherent aggregated porous metal oxides such as of iron, nickel, zinc and copper and particularly porous baked cupric oxide such as is commonly used for battery electrodes in Lalande-type primary cells; and coherent aggregated porous carbon formed, for example, by mixing 90% powdered retort carbon with 10% bituminous pitch binder, pressing to shape in a die, and then baking in an oven above incandescent temperature out of contact with air. It is to be understood however that these materials are cited only as examples since it is believed that many other porous materials will operate satisfactorily. Of the materials above specifically mentioned, the metal oxide and carbon materials are preferred examples because they have a high ventilating efficiency, have high mechanical strength and do not absorb moisture. Also, advantageously, carbon has the desirable property that it may be waterproofed by being dipped into a waterproofing agent such as kerosene and be thus rendered resistant to liquids so that its pores will not become clogged even in direct contact with liquids to the detriment of its ventilating ability.

The ventilating capacity of the porous window 10 increases with its area and decreases with its thickness; also, different porous materials behave somewhat differently, some being more efficient than others as abovementioned. As satisfactory dimensions for a window, it is found that one made of the porous carbon above described, having .25" diameter and .125" thickness, will satisfactorily ventilate an air-depolarized cell at 200 ma. continuous current discharge. When the box 1 is made large enough to house many cells of large capacity, the window has to be made accordingly larger. It may for instance be noted that for large boxes a window made an inch or two in height, a foot or more in length and say one-half inch thick is satisfactory; however, I intend no limitation of my invention to these particular dimensions.

The operation of my invention has been established by many tests and may be particularly illustrated by the following specific example: An air-depolarized cell capable of generating 200 ma. of current is placed in a container, say a jar approximately 8" in diameter and 1' high. The jar is provided with a cover having a porous window of the carbon material above described, the window having .25" diameter and ⅛" thickness and the jar being otherwise sealed. Upon discharging the cell continuously at 200 ma., the voltage of the cell stabilizes just slightly below its normal value in open air. At the same time the inside pressure stabilizes at a few inches of water below atmospheric pressure and the oxygen content within the container stabilizes at a few percentage points below that which it has in the atmosphere. If the container is next provided with a small open hole of say .050" diameter, the container remaining otherwise sealed, the inside pressure immediately equalizes with the outside atmospheric pressure, but the percentage oxygen content in the container and the cell voltage remain substantially unchanged. If the porous window is next sealed, the hole being left yet open, the cell voltage falls steadily and becomes inoperative for all practical purposes; also the oxygen content in the container falls to only a few per cent. If then the porous window is restored to effective condition, the voltage of the cell rises gradually to its former stabilized value as does also the percentage oxygen content within the container.

These observations show that the porous materials such as are abovementioned resist passing gases en masse in response to a total pressure drop across the window but that they do pass gaseous constituents in response to partial pressure drops of those constituents across the window. In the applications abovenoted, as oxygen is consumed in the battery container there is developed a partial pressure drop for oxygen across the porous window irrespective of whether the container is sealed or has some small open holes, and in response to that partial pressure drop the oxygen flows through the window into the container and maintains the cell at substantially normal efficiency. This flow of oxygen into the cell container is by diffusion through the pores of the porous window and tends to maintain equilibrium of the oxygen molecules on each side as the oxygen is used up in the cell.

The phenomenon here observed is believed to be one of a molecular flow of gas constituents through the porous window in response to the presence of partial pressure drops of those constituents across the window, and it is believed that for efficient operation of the window the effective diameters of the pores of the window material must be smaller than the mean free paths of the gas constituents which the window is to pass. It is further believed that the differences in efficiency abovenoted between the mentioned porous materials may be due at least in part to some of these materials having some pores which have diameters larger than the mean free paths of the gases and which pass whole or mixed gases en masse. This latter conclusion appears to be borne out by the observation that a battery cell container having a porous window of wood cut cross grain—which is not as efficient as say the porous carbon window—will not maintain any substantial reduction in pressure during operation of the cell even though the container is otherwise hermetically sealed.

While the foregoing theory appears to be the most plausible and logical one for explaining my invention, it is to be understood that I do not intend any unnecessary limitation on my invention in view of the advancement of this theory, for it is recognized that other causes and effects than those above explained might possibly play a part. For instance, the observed results might plausibly be due in part to fractional or selective diffusion caused by the window material operating as a sieve—that is, by the window material having pores smaller than some gas molecules and larger than others so that it can pass some gases and not others—or by gas adsorption particularly as when the porous carbon window is used and oxygen is the gas constituent to be passed by the window, or yet possibly by chemical and catalytic actions between the porous window material and the gas constituents. It is believed however that each of these different theories involves the action of molecular diffusion, and that molecular diffusion is basic to my invention.

The above described embodiment of my invention is intended to be illustrative and not limitative thereof since the same is subject to many changes and modifications and to other uses without departure from the scope of my invention, which I endeavor to express according to the following claims.

I claim:

1. In combination, an air-depolarized cell, and a substantially-closed protective housing enclosing said cell and having a wall portion of porous material, said wall portion having such area, thickness and porosity as to pass oxygen of the air into said housing by molecular diffusion as the oxygen in the housing is consumed by said cell.

2. In combination, an air-depolarized cell, a box housing said cell, said box being substantially closed to prevent any substantial mass flow of air thereinto and having an openable cover, and a window of porous material in a wall section of said box having such area, thickness and porosity as to pass oxygen of the air by molecular diffusion to said cells in response to a partial pressure drop of oxygen across said window.

3. In combination, an air-depolarized cell, and a box housing said cell having a window of porous carbon of such area, thickness and porosity as to permit the differential diffusion of oxygen of the air to said cell as the oxygen is consumed in the box, said carbon being rendered resistant to liquid penetration.

4. In combination, an air-depolarized cell, an outdoor box housing said cell and having a porous window of such area, thickness and porosity as to pass oxygen of the air by molecular diffusion to said cell as the cell consumes the oxygen in the box, and a guard for protecting said window from direct contact with elements of the weather.

5. In combination, an air-depolarized cell, a substantially-closed outdoor box housing said cell and having a porous window in a side wall thereof having such area, thickness and porosity as to pass oxygen of the air by molecular diffusion whereby to ventilate said cell, and a vertical guard adjacent to the outer side of said window for protecting the window from contact with elements of the weather.

6. In combination, an air-depolarized cell, and an outdoor box housing said cell, said box being adapted for being buried partially in the ground and having a porous window in an exposed wall portion thereof, said window having such area, thickness and porosity as to pass oxygen of the air into the box by molecular diffusion as said cell consumes the oxygen in the box, and said box being otherwise substantially closed to protect said cell from drafts and to stabilize the temperature within the box.

7. In combination, an air-depolarized cell, and an outdoor box housing said cell, said box being adapted for being buried partially in the ground and having a horizontal partition wall at the level of the ground which is provided with ventilating openings, said partition wall dividing the interior space of said box into upper and lower compartments of which the lower compartment is a storage space for said cell, and said box having a window in a wall portion of said upper compartment, said window comprising a porous material having such area, thickness and porosity as to pass oxygen of the air to said cell by molecular diffusion as the cell consumes the oxygen in the box.

LE ROY S. DUNHAM.

REFERENCES CITED

The following references are of record in the file of this patent:

UNITED STATES PATENTS

| Number | Name | Date |
|---|---|---|
| 441,843 | Hoy | Dec. 2, 1890 |
| 674,351 | Atkins | May 14, 1901 |
| 693,638 | Breuer | Feb. 18, 1902 |
| 757,637 | Reid | Apr. 19, 1904 |
| 1,496,757 | Lewis et al. | June 3, 1924 |
| 2,048,718 | Wemhoener | July 28, 1936 |
| 2,048,993 | Claffey et al. | July 28, 1936 |
| 2,068,048 | Adams | Jan. 19, 1937 |
| 2,158,238 | Hvid | May 16, 1939 |
| 2,255,069 | Maier | Sept. 9, 1941 |
| 2,276,188 | Greger | Mar. 10, 1942 |
| 2,291,548 | Gilman | July 28, 1942 |
| 2,298,938 | Griffin et al. | Oct. 13, 1942 |
| 2,323,146 | Manney | June 29, 1943 |
| 2,364,144 | Hunsaker | Dec. 5, 1944 |

FOREIGN PATENTS

| Number | Country | Date |
|---|---|---|
| 611,798 | France | July 17, 1926 |

OTHER REFERENCES

Maier, Mechanical Concentration of Gases, U. S. Bureau of Mines Bulletin 431, U. S. Government Printing Office, 1940. Pages 5–10, inclusive, and more particularly pages 9 and 10.